United States Patent
Wichmann et al.

(10) Patent No.: US 8,844,049 B2
(45) Date of Patent: Sep. 23, 2014

(54) METHOD FOR GENERATING A CRYPTOGRAPHIC KEY FOR A PROTECTED DIGITAL DATA OBJECT ON THE BASIS OF CURRENT COMPONENTS OF A COMPUTER

(75) Inventors: Peer Wichmann, Bruchsal (DE); Udo Reuther, Achern (DE)

(73) Assignee: WIBU-Systems AG, Karlsruhe (DE)

( * ) Notice: Subject to any disclaimer, the term of this patent is extended or adjusted under 35 U.S.C. 154(b) by 235 days.

(21) Appl. No.: 13/452,379

(22) Filed: Apr. 20, 2012

(65) Prior Publication Data

US 2012/0272052 A1 Oct. 25, 2012

(30) Foreign Application Priority Data

Apr. 21, 2011 (EP) .................................. 11163413
Jun. 9, 2011 (EP) .................................. 11169320

(51) Int. Cl.
*G06F 21/00* (2013.01)
*H04L 29/06* (2006.01)
*G06F 21/73* (2013.01)
*G06F 21/10* (2013.01)

(52) U.S. Cl.
CPC ............... *H04L 63/06* (2013.01); *H04L 63/08* (2013.01); *G06F 21/73* (2013.01); *H04L 63/10* (2013.01); *G06F 21/10* (2013.01)
USPC .................. 726/26; 726/7; 726/27; 713/150; 713/168; 713/170; 380/274

(58) Field of Classification Search
CPC ........................................................ H04L 63/06
USPC ...................................... 713/150, 168; 726/26
See application file for complete search history.

(56) References Cited

U.S. PATENT DOCUMENTS

| | | | | |
|---|---|---|---|---|
| 6,941,460 | B2 * | 9/2005 | Carro et al. .................... | 713/170 |
| 6,952,797 | B1 * | 10/2005 | Kahn et al. ..................... | 714/770 |
| 7,487,128 | B2 * | 2/2009 | Spagna et al. .................. | 705/51 |
| 7,779,270 | B2 * | 8/2010 | Horning et al. ............... | 713/187 |
| 2003/0016842 | A1 * | 1/2003 | Patton et al. ................... | 382/100 |
| 2003/0026259 | A1 * | 2/2003 | Brown .......................... | 370/392 |
| 2003/0221120 | A1 * | 11/2003 | Colvig et al. ................. | 713/200 |
| 2006/0064756 | A1 * | 3/2006 | Ebert .............................. | 726/26 |
| 2006/0210080 | A1 * | 9/2006 | Tuyls et al. .................... | 380/274 |
| 2007/0039058 | A1 * | 2/2007 | Alkove et al. .................. | 726/27 |
| 2010/0031374 | A1 * | 2/2010 | Jung et al. ....................... | 726/30 |
| 2010/0058057 | A1 * | 3/2010 | Sutherland et al. ........... | 713/168 |
| 2014/0032733 | A1 * | 1/2014 | Barton et al. ................. | 709/223 |

FOREIGN PATENT DOCUMENTS

WO        WO-03036442 A2        5/2003

OTHER PUBLICATIONS

EPO Search Report for EP11169320 mailed Oct. 12, 2011 (3 pages).

* cited by examiner

*Primary Examiner* — Morshed Mehedi
(74) *Attorney, Agent, or Firm* — Hubbard Law, PLLC (57) ABSTRACT

A method for coupling protected digital data object, for example an application program, and a specified computer, which allows for, if desired, individual components of the computer to be modified. A cryptographic key is generated on the basis of current components of a computer in order to decrypt an encrypted, computer-specific authorization code for executing a protected digital data object on the computer. The computer-specific authorization code is encrypted with a key based on original components of the computer. The key can be determined from the current components of the computer even if they are different from the original components of the computer.

42 Claims, 5 Drawing Sheets

[WIBU-SYSTEMS Control File]
Guid={000B0002-0000-1100-8005-0000C06B5161}
Version=1.00

RedundancyData=741D2A81AF4FFCE3770534E911FA7943E0D3F242006B1F18D333DD7592BDE56E79
CCCBD67307704B0654738C59476FC73A2BCC8DFBCE0F1909E522C405AA59012FE9F78113C38CB-
B4E1D3BE53DDB6C940B146D6AA3CBCF89FA5A65DCFC5C58EE8FDFAAC22100

; Rechnername
[Item_0] ; ,ur1.wibu.local'
ID=0474DE60FF9310F96BC1198820D7CB1165FC28465A4374D4F32BA7E82407ED97
Position=0
Length=42
Params=4E309DDBC3DA484737D06A8554030710

31

; Prozessortyp
[Item_1] ; ,00006FB'
ID=90CADF2C75CFF82E7B756ABA6ECE95D84095CB64D170108B7107E965061A6080
Position=42
Length=77
Params=426ADBE05F6DB914C4603819DFAD3856

32

; MAC-Adresse 1. Netzwerkkarte
[Item_2] ; ,00:1a:a0:d1:56:f2'
ID=956256C9913254BCA5D794F931D4A36ABF1EAFD8F45F7BC3AB761EA0131C725F
Position=119
Length=32
Params=4B328019D86CAC2C64FD1FF1ABEF4B4C ; MAC-Adresse 2. Netzwerkkarte
[Item_3] ; ,08:00:27:00:90:fd'
ID=86F54021CB65B4D09D5B37DFD14B9A85797F8118361B35CC3D272680410D5BF7
Position=151
Length=29
Params=29B17ED1C7869A5612C44B21E2429893

; Computer Security Identifier
[Item_4] ; ,S-1-5-21-34024138-2168010331-2449605542'
ID=565819B0A67830E61C1093B82C0EBDD96FAA36092CE71332C4647A14666B9F21
Position=180
Length=129
Params=ACE55626E092D1B9D2EA62CB251B7849

33

; Rechnertyp
[Item_5] ; ,<N/A>OptiPlex 755'
ID=4F08D03CF45D0D288EE345D08281D4CBC3BAF9FF37DC1FFE7B153A48F7FDB1EA
Position=309
Length=16
Params=EB69B929B7327FEC946670956B4D2ACF ; Motherboard Seriennummer
[Item_6] ; ,CN1374079K000B'
ID=EB7648DD6AD77D812A0AD2A9BE6DA09EBF423BA12BCA7C1511F87F1908487406
Position=325
Length=32
Params=CF8D8B36E459791A6B074A187C4198E5

```
; BIOS-Version
[Item_7] ; ,57M663J4C4C4544-0037-4D10-8036-B5C04F36334A'
ID=4A56E0614F43C8A4FF0A93DBFE40CB2DD406073C929F066FE1E686ECA821F354
Position=357
Length=32
Params=0ADAC719664079BA7CD98B8A35CC835C ; Hersteller des Rechners
[Item_8] ; ,Dell Inc'
ID=952233FE2A95A79C7ABD7694E16BE9E35D47B1D41A027942E9673B96CCAA8AAB
Position=389
Length=23
Params=E2B7E848E34303BE7DA6F2202609B2CE ; Hersteller der Grafikkarte
[Item_9] ; ,Intel Graphics Media Accelerator 950'
ID=72BBA7F31ED69FC809555BB76F712034AFDCB8EFA52734B58D99E65465D0D2F9
Position=412
Length=24
Params=243FEB24DC41E1A396A0C9438BD89475

; Typ der Netzwerkkarte
[Item_10] ; ,Intel Gigabit Ethernet Controller'
ID=1DC14D3165DE56E96886A24DA049A6D773BCDF3A2C3FAD8F5B2E3B6F23B981E6
Position=436
Length=26
Params=290D623E612F550646A7070766F064F6

; Typ der Soundkarte
[Item_11] ; ,Intel(R) High Definition Audio Controller'
ID=55FDEFADE1061781B8E5220FBB09E15553BAC90C4F4B26089CD58C273EBE760D
Position=462
Length=12
Params=BA44AAD93227A9627D5A74B1FBCE3F0D ; Typ der 1.Festplatte
[Item_13] ; ,ST3160815AS'
ID=73A13C192A1806DC353344C1FBC164958020803C11552A2E86A177FE5AAF52C2
Position=474
Length=14
Params=129EF5CCC3F1BF0A632876DD6235BD85

; Info zur 1.Festplatte
[Item_14] ; ,3.ADA'
ID=52C9EDAF306D2EF8FA151CD9FFA88D0BF097A0140F916453B507ED0B23DA8A29
Position=488
Length=12
Params=908E68B5D5490B50DFBB1150D32DA5C6

; Seriennummer der 1. Festplatte (alternatives Ausleseverfahren)
[Item_15] ; ,202020202020202020202020205235315836433641'
ID=F9D84123BC7C9D2BB2A544AA67EB8CBC8C1CCF0361F25D4101142F64098C442E
Position=500
Length=12
Params=73F843A490DF7F025ACF106E833B5AF4
```

METHOD FOR GENERATING A CRYPTOGRAPHIC KEY FOR A PROTECTED DIGITAL DATA OBJECT ON THE BASIS OF CURRENT COMPONENTS OF A COMPUTER

TECHNICAL FIELD

The invention pertains to a method for generating a cryptographic key on the basis of current components of a computer for digital rights management.

BACKGROUND OF THE INVENTION

The term "digital data object" will be used with its general meaning, according to which a data object is a structured element of associated data, which can be stored temporarily on a medium or in a memory. The term "digital data object" thus encompasses executable files, such as executable programs, applications or application programs, programs in machine language or in script languages. It also includes non-executable files, such as programs in the source code, text files, database files, audio files, image files, video files or other digital contents, or general binary files such as are used by proprietary programs for storing data. Device files, such as mouse drivers or other driver files are also included. At the same time, besides these types of data objects, which remain stored after the runtime of a program and are characterized as non-volatile files or data objects, the term also refers to "live stream" data objects or data, such as streaming video data, which is held on a computer only for a certain time, frequently in volatile storage, for example the RAM.

Digital data objects such as application programs are typically protected on data processors or computers by electronic protection mechanisms such as licenses or digital rights management systems (DRM systems). In this manner, it is ensured that only registered users or users who have purchased a license are actually authorized to use a digital data object, to run an application program for example. The object underlying the invention and the solution will hereafter be described with reference to application programs but without thereby limiting its general applicability.

It is normal, for example, supply a license number or product key when installing the application program or software, and to key it into an electronic form. For the purposes of the present patent application, the terms application programs and software will be used synonymously. These are executable files that can be executed on a computer or data processing device. The terms "device, data processing device, data processor and computer" will also be used interchangeably except where otherwise indicated.

Besides the option to enter a license key during installation, it is also known to use "dongles." A dongle is a data processing device that is connected to a computer and used as an authorization key for an application program. Dongles may have the form of USB sticks for example. The protected computer program then checks whether the corresponding dongle is present during execution or when the program is started.

It is also known to couple the software to be protected with a certain computer in order to protect software programs. When a program is started, certain components of the computer are queried automatically: their specific values, for example their serial numbers or the "MAC address" of the computer are determined. If all necessary components are present, the software is permitted to run. In this type of check, the system not only verifies that the corresponding hardware component is present, but also whether the hardware component is the one for which the license was granted. This makes it impossible for the software to be run on another computer with hardware components of the same kind. The software requires exactly the same components that were present when it was installed or when the license key was generated.

With this type of protection, as far as possible the computer or other technical device must be identifiable unambiguously and unforgeable. However, this is complicated by the fact that over time the devices undergo technical transformation due to repairs, modifications of individual components such as updates, changes in their field of use or the requirements they must satisfy. It may also happen that individual components are temporarily not present at all: for example, if the computer's operating environment changes, a second network card that was in the computer originally may have been removed. It is also possible that individual features of the computer, that is to say components, cannot be identified correctly for a period of time. This may be caused by software errors, runtime-related system limitations, or by individual components being temporarily disabled or developing short-term faults.

In many cases, the identification of individual components or a computer will relate to the licensing of digital files, application programs or software, or the evidence of warranty claims. Claims of this kind can then be processed automatically, without manual intervention.

With this type of licensing, which ensures that a licensed software product can only run on a specific computer, the owner of the right may be assured of good protection. In this way, it is ensured that the digital file cannot be installed or run on any other computer. It also provides the user with a simple way to guarantee that purchased digital files are only executable on his computer. No additional devices (such as dongles) need to be installed on the computer, and no long installation keys need to be noted and entered via the keyboard. Moreover, such a key cannot be lost because the software can be re-installed on the computer in question at any time. However, the drawback of this method is that no changes, or only extremely limited changes, can be made to the computer.

Therefore, in the prior art only a few features or components of the computer are used to guarantee this kind of protection. As a rule, not all of the components (features) that were originally installed on the computer have to be physically present. It is considered sufficient if, for example, three out of five features are present. Now combinations or permissible configurations can be determined from the originally defined features, in which for example three of five features are present. This results in a total of ten options, that is to say ten permissible configurations that must be queried and checked. A larger number of features results in a very large number of combinations, rendering the process inflexible and slow.

If protection for the rights owner is to be improved by requiring that a plurality of features must be verified, or that a smaller subset of a plurality of features must be verified, the number of combinations grows very rapidly. For example, if four out of ten components must be identical with the original components, this results in a total of 210 (=(10*9*8*7)/(4*3*2*1)) possible combinations. The number of possible configurations is calculated from the binomial coefficient of (N, k), where N is the number of originally present components and k is the number of components currently present that must match the original components. This method is therefore impractical and not commonly used.

SUMMARY OF THE INVENTION

The present invention concerns one or more aspects of a method for coupling protected digital data object, for example an application program, and a specified computer, which allows for, if desired, individual components of the computer to be modified.

In one example of such a method, a cryptographic key is generated on the basis of current components of a computer. The cryptographic key is used to decrypt an encrypted, computer-specific authorization code. The authorization code is used to enable the use of a protected digital data object, for example to run an application program or a protected application on the computer or data processor. The computer-specific or device-specific authorization code is encrypted by means of a cryptographic key, which in turn depends on the original components of the computer. The original components of the computer are those components that serve as the basis for generating the authorization code. They may be for example the components that were initially present on a given computer when the application was installed for the first time, and which can be called and used by the corresponding method. The original components may also be the components that were detected initially at the time a license was purchased by a rights owner, or at the time the authorization code was installed, or at another predetermined time.

In order to be able to identify a computer or other technical device uniquely, the greatest possible number of identification features is recorded. The identification features are based on the components of the computer or another technical device on which the protected digital device is to be used. The identification features for the original components of the computer are stored in an inventory list. In this way, it is determined which features of the computer are to be identified, in other words, the components of the computer for which features must be present.

As an example, the method will hereafter be explained for licensing a digital data object for a specific computer without thereby limiting its general applicability.

The current value of the feature is automatically determined for each feature of the computer appearing in an inventory list (for example for each hardware component of the computer) in order to generate the cryptographic key when the protected digital data object is used. The inventory list includes the features for the original components of the computer, for example when the protected digital data object was licensed or a protected application program was installed, original checksums for each original feature value associated with the features stored in the inventory list, and also redundancy values that have been determined from the total set of original feature values. The current checksums are calculated for each of the current determined feature values. In a further step of the method, the current checksums are compared with the original checksums, which initially calculated from the original feature values. If the original checksum and the current checksum match, in a subsequent step the current feature value is stored in a current feature vector. If the checksums do not match, that is to say if the original checksum and the current checksum for a feature value of the computer are different, spaces are inserted in the current feature vector instead of the current feature value. In this manner, a current feature vector characterizing the current status of the computer and its components is created.

If a few features of the computer have been changed, for example because components have been replaced, updated or removed, the current feature vector is adapted in a further step by means of the available reference data via the method according to the invention. The missing feature values in the current feature value vector are determined using the redundancy values. The current feature value vector is then completed with the determined feature values, so that the empty or incorrect positions in the vector are overwritten. If the computer has not been changed, the result is a complete feature vector.

The cryptographic key is generated from the complete or completed feature value vector, and this enables the computer-specific authorization code to be decrypted. The cryptographic key is generated preferably by, for example, means of a key derivation function. This term is used to refer to a cryptographic primitive with which cryptographic keys are derived from a set of raw data. The key created in this way cannot be related back to the raw data or to any other derived keys. An example of such a key derivation function is a cryptographic hash function.

When the cryptographic key has been created upon completion of the method, the encrypted authorization code may be decrypted, preferably in a further step. The digital data object may be activated with the decrypted authorization code so that it can be used by the user. In the case of audio files for example, the music or sound may be heard, video files may be viewed, application programs may be executed. The method according to the invention is run for example every time the computer or the application is started, or every time a digital data object is used. The method may be implemented in a computer program for example, or stored on a computer as an executable file.

In an advantageous refinement of the method, the inventory list with the original components of the computer is generated before the first time it is run. The inventory list may be used to determine the features for which data was collected initially. No new analyses have to be carried out for hardware features and/or components that have been added since then. Examples of such would be new sensors in industrial systems or additional network adapters in computers. The checksums or check values associated with the features for which data has been collected may be used to determine whether the feature values match those recorded initially, but without disclosing the current feature values. Besides checksums, cryptographic test mechanisms such as hash sums or bit commitment protocols might also be used. These mechanisms ensure that the feature value vector may contain misses, voids, or incorrect positions, but no errors.

Before the method according to the invention is able to run and generate the cryptographic key for decrypting the authorization code for protected digital data objects, a plurality of steps must be carried out one time each. These steps will usually be performed while a program is being installed or when a license is purchased. For this, an inventory list containing features for the original components of the computer is first generated. The original components of the computer are the components that are present when the inventory list is created. The license, or the computer-specific authorization code is encrypted using a key that depends on these original components. The inventory list only includes the features (for example the network card or hard disk), not the feature values themselves (for example name of manufacturer, serial number).

In a further step, the original feature values are determined for the features that are stored in the inventory list. For the feature network card, for example, this may be the name of the manufacturer, or for the feature "hardware address of a network card" this may be the "MAC address" itself as feature value. An original checksum is determined for each of these original feature values. This is a checksum or check digit that does not permit a connection to be made with the value of the original feature value, but which allows a check of the original feature value.

In a further step, redundancy values are derived from the entire set of original feature values, and these enable missing feature values to be calculated. In general, it is important that only as many missing values can be corrected or calculated as there are redundancy data indicated. For example, if 128 bits of redundancy data are indicated for a system, not more than 128 bits of error values or missing values can be corrected. In this way, the number of redundancy values or the value set thereof may be used to define how many feature values can be generated even though the feature values themselves are not present.

In a preferred embodiment of the method, an "original inventory list" is created after the generation of the inventory list with the features for the original components of the computer and after the checksums of the original feature values and the redundancy values have been determined. This includes the initially defined original feature values of the computer, the checksums of the corresponding original feature values, and the redundancy values. The feature values themselves are not included in the inventory list. In a further step, one or more cryptographic keys are generated from the entirety of all original feature values, and these are used to generate a computer-specific authorization code for the digital data object that is to be protected. The original inventory list and the generated keys are automatically transmitted to a server, preferably over a network, the internet or another data link between the server and the computer.

After the data has been sent to the server, the original feature values and the generated keys are deleted from the computer, so they are no longer available for further use. After the data has been received by the server, the device-specific authorization code for using the protected digital data object is generated using the cryptographic key or keys that has or have been received on the server. It is encrypted with the cryptographic key from the computer. The authorization code generated in this way is transmitted from the server to the computer. The digital data object can only be used if the encrypted authorization code is decrypted. For this, the key must be regenerated from the computer's current feature values. Since the original feature values and the keys generated therefrom have been deleted from the computer, it is impossible for them to be used to decrypt the authorization code. In this way, the owner of the rights to the digital data object has the assurance that the protected data object can only be used on the computer for which the license has been granted, or for which permission and authorization has been issued.

In a further preferred embodiment of the method, the original inventory list is also transmitted from the computer to the server as well as the generated key. Both the original inventory list and the original checksums are deleted on the computer as soon as the data has been transmitted. The original inventory list, which comprises the features, the original checksums for the original feature values and the redundancy values, is signed on the server. In a preferred embodiment of the method invention, the original inventory list in modified on the server in such manner that integrity protection of the modified inventory list is assured. Integrity protection is preferably assured by inserting a digital signature or a cryptographic key, which is taken into account when the inventory list is evaluated on the computer. The integrity key is preferably used when the original checksums are compared with the current checksums. In this way, the rights owner is assured that the original checksums, which have been signed on the server, and/or encrypted original checksums are used for the comparison. This makes it much more difficult to inadmissibly circumvent the method and protection for the authorization code is enhanced.

In a further step, the signed inventory list is transmitted to the computer. It is stored on the computer and serves as the basis for querying the current feature values of the computer's individual features.

The method has the advantage that it enables the determination of many features that serve as a basis for licensing. Since missing features of the current device configuration may be determined by means of the redundancy data, it is not necessary to establish a fixed feature combination, as it is usual in the related art. Instead, it is sufficient if a predetermined number of features are present and recognized. This provides the advantage that the protected digital data objects may still be enabled even if changes have been made to the computer's hardware configuration, for example. Although the original hardware identification and configuration are transmitted to the manufacturer—this is performed on the basis of the inventory list—and the data object is enabled specifically for this computer, deviations and changes to the configuration are permitted with certain limits. The precise tolerance parameters may be defined by the licensor of the digital data object, for example the owner of the rights to a software product, or automatically using an algorithm. The parameters are stored on the server and are available there for automatic use.

The method according to the invention offers the further advantage in that licensing may be based on more than just a large number of features. Other features may be used besides the computer's components. For example, feature values may (additionally) be used from "tokens", such as ID cards, USB sticks or flashcards. It would also be possible to use a device identification of a mobile device, of a cellular phone or smartphone for example, which must communicate with the computer via a wired or wireless connection. In this context, the IMEI number of the cellular phone might be used for identification. If electronic identity cards or other ID cards are used, personal data or person related data may also be used as the basis for key generation and encryption. These are preferably recorded in addition to the computer's components.

The method has the advantage that different weighting factors may be applied to the individual features, that is to say the computer's components or comparable features. The feature values in the feature value vector are of different lengths depending on the feature. Components that are seldom changed or have a high priority advantageously receive a higher weighting, which is reflected in feature values of greater length in the feature value vector. For example, the address of a network card might be defined with 32 bits, whereas the serial number of the graphics card or the computer's BIOS version are each indicated with 16-bit length. The feature value of a TPM chip (Trusted Platform Module) might have a length of 128 bit, for example. This corresponds to a weighting of 25% in a typical feature value vector having a length of 512 bit. A TPM chip is what is known as a smartcard chip, which is hardwired to the computer and has its own serial number. It is usually permanently soldered to the computer's motherboard and is used for example for securely storing secret keys or similar information that is intended to be inaccessible.

In a preferred embodiment, the feature value vector has a length of at least 64 bit, 128 bit, 256 bit or preferably at least 512 bit. For particularly secure applications, the feature value vector may have a length of at least 1024 bit, 2048 bit or 4096 bit. Of course, longer feature value vectors can be used.

Besides the weighing of the individual features via the length of the feature values, the dataset of the redundancy values is also used to define how tolerant the method is. Thus it may be used to define how many changes may be made to a computer, or how many features are permitted to be changed or missing. The dataset of the redundancy values is therefore preferably lower than the total dataset of all feature values. The limit value for the set of redundancy values is preferably not more than 10% of the data of the feature values. 90% of all feature values must thus match the original feature values. It follows that 90% of all bits in the original feature value vector must also be present in the current feature value vector. Only 10% may be different and detected by the redundancy values. In another preferred embodiment the method, the dataset of the redundancy values is not more than 20%, 30%, 40%, 50%, 60%, 70% or 80% of the feature values dataset. The larger the dataset of redundancy values, the more deviations the method permits. This has the advantage that the licensor is able to define how tolerant the licensing should be.

In a preferred embodiment of the method according to the invention, the entirety of redundancy values is not permanently fixed, it may be increased over the runtime (of the license), since individual components are replaced more often in older computers and data processors. For example, it is common to replace the hard disk with a larger one or to replace the processor with a faster one after a certain time. Accordingly, the dataset of redundancy values used is increased as a function of the time that has passed since the first time the protected digital data object was used. This increase is preferably made incrementally.

It is particularly preferred if the time that has passed since the first use of the protected digital data object is counted on the computer. Initially, only a small fraction of the redundancy values is used to identify missing feature values. The fraction of redundancy values used is increased as time passes. For example, initially only 20% of the redundancy values used might be considered, then 30% after a year, 40% after two years, and 50% or 60% after three years.

In addition, it has proven advantageous if the redundancy values are transmitted to the server and deleted from the computer. The redundancy values are preferably signed on the server, for example with a signature file or an electronic cryptographic key, and then transmitted to the computer, where they are stored and used to identify the missing feature values. This provides the capability to ensure integrity protection for the redundancy values. The rights owner thus has complete control over the method.

The received redundancy values are preferably modified on the server, the dataset of redundancy values is particularly preferably reduced before it is transmitted back to the computer. In this way, the rights owner is able to specify how many of the redundancy values are available.

In a preferred embodiment of the method according to the invention, the entirety of the generated redundancy values is divided into a plurality of subsets. Each of the redundancy value subsets is encrypted using a separate cryptographic subset key. The cryptographic subset keys are made available to the computer on a temporally defined basis. As the time since the first use of the digital data object increases, more redundancy values may be made available. Consequently, the licensing method becomes more tolerant regarding changes to the components of the computer as time passes. The subset keys, which are necessary in order to decrypt the encrypted subset of redundancy values, may be made available on a separate computer, preferably a server. Particularly preferably, they are published in a network, over the internet for example. The computer on which the protected digital data object is to be used is able to download the keys automatically, and decrypt another subset of redundancy values.

In another preferred embodiment of the method, the tolerance of the method for errors or for missing values over its runtime is modified by a mechanism that recognizes when the current feature values differ from the original feature values each time the protected digital data object is used and the computer's current feature values are determined. However, the deviation of the feature values is tolerable enough that the missing feature values may be calculated from the available redundancy data. The redundancy values are then updated on the basis of these current feature values. The redundancy values may be updated by the addition of new redundancy values so that it is possible to continue using the original key on which the encryption of the authorization code is based. Alternatively, the redundancy values may be updated by generating a new cryptographic key on the basis of the current feature values, that is to say on the basis of the current features of the computer components. The difference between the new cryptographic key and the original cryptographic key is stored on the computer. By comparing a newly generated key with the difference from the original cryptographic key, a key may be calculated that can be used to decrypt the authorization code.

BRIEF DESCRIPTION OF THE DRAWINGS

Special embodiments of the method according to the invention for generating a cryptographic key will described in greater detail hereafter with reference to the figures. The features described may be used alone or in combination to create preferred embodiments of the invention. The method according to the invention will be explained with reference to a protected application program as the digital data object that is to run on a computer, but without limitation to the general applicability thereof. The features described using the example of the application program and the computer do not represent a limitation of the general applicability of the features defined in the claims. In the figures:

FIG. 3 shows an example of an extended inventory list,

DETAILED DESCRIPTION OF THE INVENTION

Figure 1:
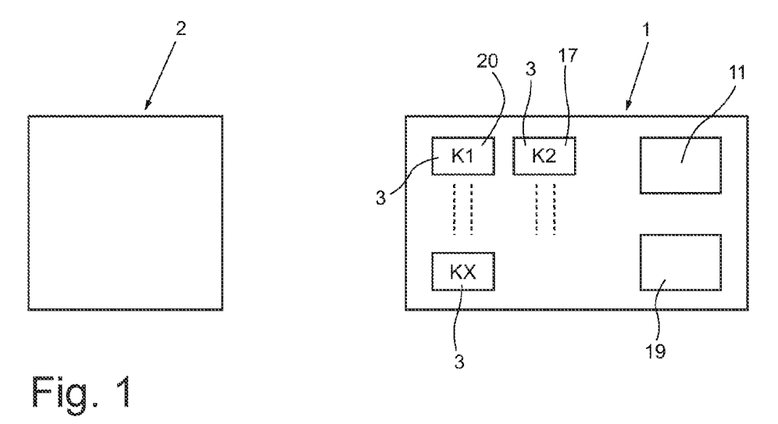
FIG. 1 shows a system comprising a server and a computer of a user, on which a protected software product is to run.

FIG. 1 shows a system including a server 2 and a computer 1, on which a protected digital data object, such as an application program, is to run. Data object 11 is licensed by a rights holder and is protected by an authorization code. The authorization code for activating data object 11 is bound to computer 1. The authorization code is created by the rights owner's server and transmitted to computer 1.

In order to create and encrypt the authorization code, features 3 of computer 1 are used. These features 3 reflect the individual components K1, K2, K3, . . . Kx of computer 1. A component may be for example the network card, the motherboard, the graphics card, the hard disk, the operating system version, the computer name or the identification or serial number of a security processor (TPM chip). An inventory list 4 incorporating features 3 is generated on the basis of these features 3.

In a preferred embodiment of the method, in a first step a default set (a preset list) of features 3 is created on server 2, and this is used to create inventory list 4 on computer 1. The default set of features 3 for inventory list 4 is transmitted to computer 1. From this set, an inventory list 4 including features 3 is generated on computer 1 in accordance with the default set of server 2. These options steps are shown in the method workflow of FIG. 6 as steps S1 to S3.

Figure 6:
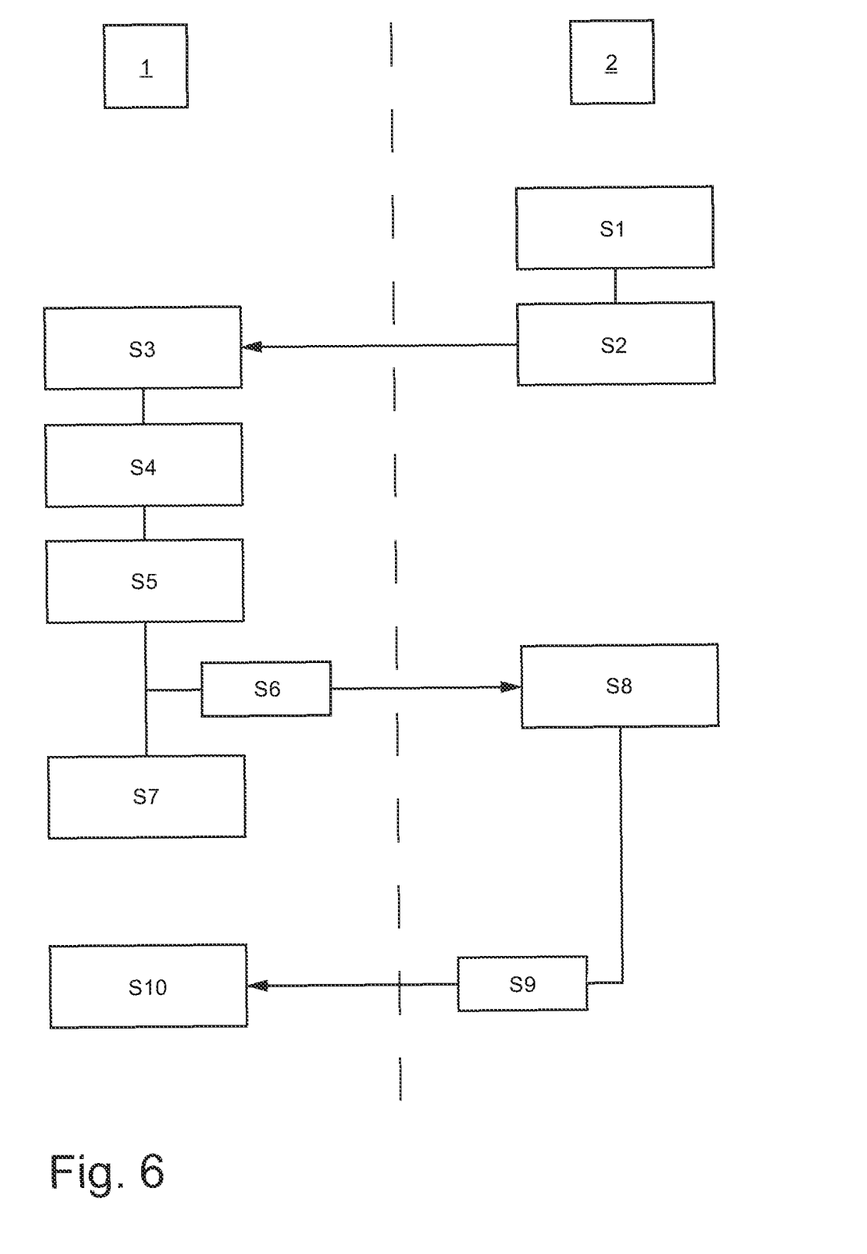
FIG. 6 shows a diagrammatic workflow for a part of the method.

According to a preferred embodiment of the method, an inventory list 4 including features 3 of the original components K1, ..., Kx is now generated in a step S4 shown in FIG. 6. In a further step, original feature values 5 are determined for the features 3 that are included in inventory list 4. An original feature value 5 may be for example the serial number of the motherboard or of the hard disk. Original checksums 6 are identified from the collected data (original feature values 5), an original checksum 6 (P1, P2, ..., Px) being allocated to each original feature value 5. Redundancy values 7 are additionally determined from the entirety of all original feature values 5. These enable error correction to be carried out as the method according to the invention progresses.

Figure 4:
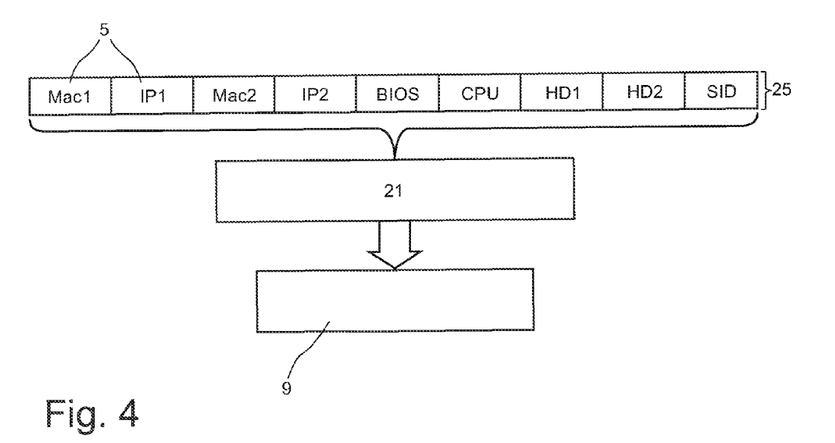
FIG. 4 shows an original feature vector.

In a next step, an original inventory list 8 is now generated from features 3 of computer 1, original checksums 6 and redundancy values 7. In addition, a cryptographic key 9 is generated from the entirety 25 of original feature values 5 with the aid of a cryptographic function 21, for example a hash function, see FIG. 4. The method step is represented as step S5 in FIG. 6. Cryptographic key 9 is a "sensitive key" which can only be used within the program or method. It is only stored temporarily in a volatile memory. It cannot be read out by other programs and may optionally be particularly protected against external attacks.

If digital data object 11 is an application program 12, it is preferred according to the invention that original inventory list 8 is generated at the time when application program 12 is installed on computer 1.

Cryptographic key 9 is transmitted to server 2 and received there in step S6. Original feature values 5 and cryptographic key 9 are deleted from computer 1 in a step S7. In a step S8, a computer-specific authorization code 10 enabling use of protected digital data object 11 (for example protected application program 12) is generated on server 2 using the received cryptographic key 9.

Figure 2:
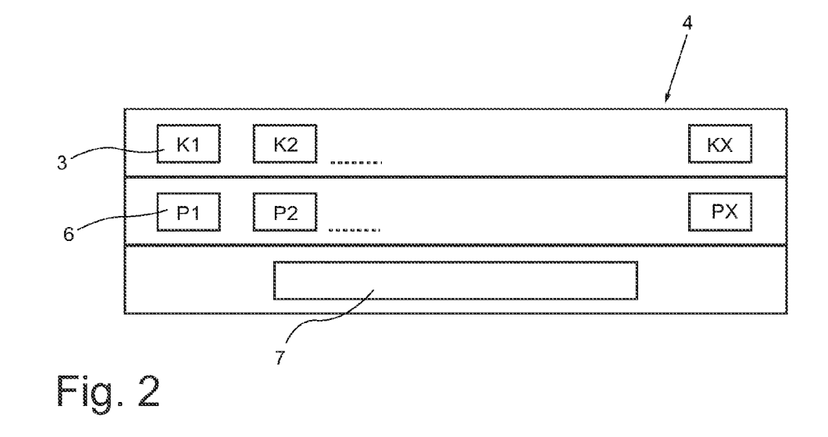
FIG. 2 shows an inventory list with features of the computer of FIG. 1.

In step S9, encrypted authorization code 10 is transmitted from server 2 to computer 1 and is stored on computer 1 in a step S10. Authorization code 10 is preferably stored securely on computer 1 in the same manner as original inventory list 8, for example in TPM chip 17. Cryptographic mechanisms for integrity protection or technical measures for concealing the storage location and redundant storage serve as protection concepts. FIG. 2 shows a diagrammatic representation of original inventory list 8 having a plurality of features 3, original checksums 6 (P1, P2, ..., Px) and redundancy values 7.

In order to lend individual features 3 in inventory list 4 a weighting factor, different lengths are assigned to each feature value 5. The feature values 5 are combined in a feature value vector 13. Information about the length of individual feature values 5 associated with a given feature 3 and the position of the respective feature value 5 in feature vector 13 may be provided in an expanded inventory list 14.

FIG. 3 shows an enhanced, extended inventory list 14. The inventory list 14 shown here includes several items of additional information, to enable a clearer explanation of the list and its contents. The values indicated in [item_x] (x=1, 2, ...) are inserted comments. They essentially correspond to feature value 5. These values are not included in the expanded inventory list 14 that is stored on computer 1.

The illustrated inventory list 14 initially comprises a header and a plurality of lines (three lines in this case). The header comprises for example information about the creator of the inventory list. The list then contains redundancy values 7, followed by the information about individual features 3.

In this preferred embodiment of inventory list 14, the feature value vector 13 for each feature 3 of computer 1 initially includes feature 3 itself (component, for example "computer name"), (then the comment added as [item_0]) followed by original checksum 6, the position and length of the associated feature value 15 in feature value vector 13. The final item of information is an optional item for administrative purposes ("Params"), which is necessary for the administration of inventory list 14 itself and for determining feature values 15. The information regarding position and length of feature value 15 are optional elements in this embodiment. The length of the feature value should preferably not exceed a predetermined number of bits, for example 256 bit, 192 bit or preferably 128 bit.

In inventory list 14, feature 31 is the computer name. In the present case, feature value 15 for feature 31 "Computer name" is written in position zero of feature value vector 13. The length of this feature value 15 is 42 bit.

The second feature 32 in inventory list 14 is the processor type. Feature value 15 for the processor type is written at position 42 in feature value vector 13 and has a length of 77 bit. In all, extended inventory list 14 causes feature value vector 13 having a length of 512 bit. Accordingly, the processor type has a very heavy weighting with 77 bit. Only feature 33 of the "Computer Security Identifier", with a length of 129 bit, is more heavily weighted.

Figure 5:
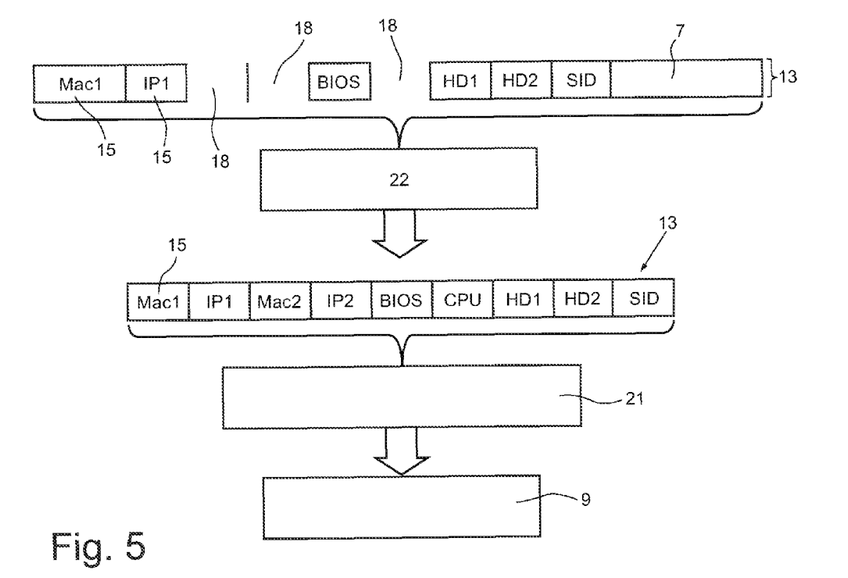
FIG. 5 shows a workflow for generating the key using a current feature value vector.

The individual steps of the method according to the invention are cycled through on the basis of inventory list 14 every time the program is started. First, features 3 are read out from inventory list 14 and the associated current feature values 15 of computer 1 are determined. The current checksum 16 is calculated for each feature value 15 individually and compared with the corresponding original checksum 6 of individual feature 3. If original checksum 6 is identical to current checksum 16, detected feature value 15 is stored in feature vector 13 at the corresponding position and with the corresponding length, as specified in inventory list 14. If current checksum 16 is not found to be identical to original checksum 6, the value intended for the feature 3 in feature value vector 13 is filled with spaces 18 (dummy feature value, void entry). A feature value vector 13 of this kind containing spaces is shown in FIG. 5.

Redundancy values 7 from inventory list 14 are preferably appended to feature value vector 13. This extended feature value vector 13 is then processed further, preferably with an evaluation algorithm of an evaluation unit 20 in computer 1. Error correction is now performed. In this, the missing feature values 15 are calculated. The feature values 15 missing from the current feature value vector 13 are preferably derived from redundancy values 7, which are based on the activation data 5 (initially collected feature values 5), using an error correction method. One preferred error correction method involves the use of erasure codes. Linear random codes are particularly preferred. The codes may also be classic error correction codes, such as are known from coding theory.

If the missing feature values 15 in current feature value vector 13 cannot be completely reconstructed from redundancy values 7, it is not possible to decrypt encrypted authorization code 10. Application program 12 cannot be executed or digital data object 11 cannot be used. Optionally, a notification (error message) may be transmitted to the server.

If the current feature value vector 13 can be completed using error correction methods, cryptographic key 9 is then generated in a subsequent step. This key is preferably calculated from feature values 15 with the aid of a cryptographic function 21. Very preferably, a cryptographic checksum, particularly preferably a hash function is used. Authorization code 10 is decrypted using cryptographic key 9 and digital data object 11 or protected application program 12 is enabled for use.

The method according to the invention is preferably performed automatically on computer 1 every time before protected application program 12 is executed, so that current feature values 15 of current features 3 of computer 1 are determined every time before application program 12 is run.

When the method according to the invention is used, in order to protect the rights holder it must be ensured that decrypted authorization code 10 and/or generated cryptographic keys 9 are deleted from computer 1, preferably after authorization code 10 has been decrypted and/or after protected digital data object 11 has been enabled and/or after every time protected digital data object 11 is used. In this way, it is ensured that authorization code 10 and/or cryptographic keys 9 cannot be used subsequently (without authorization) or on another computer.

The generated cryptographic key 9 is preferably only stored temporarily in a volatile memory on computer 1 and preferably cannot be read out and used by any program except protected application program 12. In addition or alternatively, decrypted authorization code 10 cannot be stored except in a volatile memory 19 on computer 1. After the user has finished using digital data object 11 or running application program 12, volatile memory 19 is cleared again.

In a preferred embodiment of the method, the method is implemented in the form of a computer program that is able to run automatically on a computer. The computer program with the implemented method may also constitute part of the protected application program. It may also be a standalone program that is called when the data content of data object 11 is to be read out or used. Programs may be stored on any form of computer readable media.

The foregoing description is of various examples embodying, at least in part, certain teachings of the invention. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments.

What is claimed is:

1. Method of generating a cryptographic key on the basis of current components of a computer for decryption of an encrypted, computer-specific authorization code for activating a protected digital data object on the computer, wherein the computer-specific authorization code is encrypted by means of a key depending on original components of the computer, the method comprising:
    generating an inventory list of features for the original components of the computer;
    determining original feature values for the features stored in the inventory list;
    determining original checksums for each of the original feature values;
    determining redundancy values from the entirety of original feature values;
    determining current feature values for the features of the computer stored in the inventory list;
    calculating current checksums from the current feature values;
    comparing the current checksums with the original checksums;
    if the original checksum and the current checksum are identical, storing the current feature values in a current feature value vector, and if they are not identical, inserting spaces in the current feature value vector instead of the current feature value;
    determining missing feature values in the current feature value vector using redundancy data;
    completing the current feature value vector with the determined feature values;
    generating the cryptographic key to decrypt the authorization code from the feature value vector.

2. The method according to claim 1, further comprising:
    creating an original inventory list including the features of the computer, the checksums of the features and the determined redundancy values;
    generating the cryptographic key from the entirety of the original feature values;
    transmitting the original inventory list and the generated key to a server and receiving the data on the server;
    deleting the original feature values and the key from the computer;
    generating the device-specific authorization code for use of the protected digital data object using the received cryptographic key on the server;
    transmitting the authorization code encrypted with the cryptographic key from the server to the computer and receiving the authorization code on the computer;
    and/or by the further steps:
    decrypting the encrypted authorization code using the generated cryptographic key, and
    activating the protected digital data object using the decrypted authorization code.

3. The method according to claim 1 further comprising:
    transmitting the original inventory list to the server;
    deleting the original inventory list including the original checksums on the computer;
    signing the original inventory list on the server;
    transmitting the signed inventory list to the computer and receiving the signed inventory list on the computer.

4. The method according to claim 1, further comprising:
    transmitting the redundancy values from the computer to the server;
    deleting the signed redundancy values on the computer;
    signing the transmitted redundancy values on the server; and
    transmitting the signed redundancy values from the server to the computer and receiving the signed redundancy values on the computer.

5. The method according to claim 4, further comprising:
    changing the received redundancy values on the server;
    transmitting the changed redundancy values to the computer.

6. The method according to claim 1, wherein the protected digital data object is an application program.

7. The method according to claim 1, further comprising:
    creating a preset list of features (pattern of features) on the server for creating the inventory list on the computer;
    transmitting the preset list of features (pattern of features) for the inventory list to the computer;
    generating an inventory list with features of the computer according to the preset list (pattern of features) received from the server.

8. The method according to claim 1, wherein the inventory lists comprise, for each feature of the computer, at least one of the following: the information regarding the position of the associated feature value in the feature value vector; and information about the length of the feature value for each feature wherein each feature value does not exceed a predetermined number of bits.

9. The method according to claim 1, wherein the inventory list comprises further administrative information necessary for administering the inventory list and for determining the feature values.

10. The method according to claim 1, wherein the feature value vector comprises at least 64 bits.

11. The method according to claim 1, wherein the feature values are of different lengths in the feature value vector depending on the feature.

12. The method according to claim 1, wherein the dataset of redundancy values is smaller than the full dataset of all features values, wherein the set of redundancy values is at mots 70% of the dataset of the feature values.

13. The method according to claim 1, wherein the cryptographic key is calculated from the feature values by means of a cryptographic function.

14. The method according to claim 1, wherein the missing feature values in the current feature value vector are determined from the redundancy values using an error correction method with error correction code comprising one of the erasure codes for linear random codes.

15. The method according to claim 1, wherein the original inventory list is modified on the server in such manner that an integrity protection of the changed inventory list is guaranteed, wherein the integrity protection is provided by appending a digital signature or a cryptographic key that is considered when evaluating the inventory list on the computer when comparing the original checksums with the current checksums.

16. The method according to claim 6, wherein the original inventory list is generated when the protected application program is installed on the computer.

17. The method according to claim 6, wherein the current feature values of the current features of the computer are determined before each time the protected application program is run.

18. The method according to claim 1, wherein, the decrypted authorization code an/or the generated cryptographic key is deleted from the computer after the authorization code has been decrypted and/or after the protected digital data object has been activated and/or after each time the protected digital data object has been used.

19. The method according to claim 1, wherein the cryptographic key generated from the feature value vector and/or the decrypted authorization code is temporarily stored in a volatile memory of the computer.

20. The method according to claim 1, wherein the used dataset of redundancy values is increased in accordance with the time that has elapsed since the protected digital data object was used for the first time.

21. The method according to claim 20, wherein, the time since the first use of the protected digital data object is counted on the computer and the set of redundancy values used is increased according to the elapsed time, wherein initially only a small fraction of the redundancy values generated is used to determine the missing feature values, and the fraction of used redundancy values increases as time passes.

22. The method according to claim 20, wherein the entirety of generated redundancy values is divided into a plurality of subsets, wherein each subset of the redundancy values is encrypted with a separate cryptographic key and the cryptographic keys are made available to the computer on a time-related basis, wherein the availability thereof is assured by the key required for decrypting the encrypted subset of redundancy values being published and downloadable on a separate computer.

23. The method according to claim 20, wherein,
if, during use of the protected digital data object and the determination of current feature values of a computer's current features carried out in the context thereof, deviation of current feature values from the original feature values is detected and the missing feature values are capable of being calculated from the existing redundancy values,
then the redundancy values are updated on the basis of the current feature values,
wherein the redundancy values are either updated by the addition of new redundancy values, or by the generation of a new cryptographic key based on the current feature values, which are determined on the basis of the current features of the computer components, wherein the original cryptographic key and a difference between the new cryptographic key and the original cryptographic key are stored on the computer.

24. A non-transitory computer readable media storing instructions for causing a computer, when read by the computer, to perform a method for generating a cryptographic key on the basis of current components of a computer for decryption of an encrypted, computer-specific authorization code for running a protected digital data object on the computer, wherein the computer-specific authorization code is encrypted by means of a key depending on original components of the computer, the method comprising:
determining current feature values for features of the computer that are stored in an inventory list wherein the inventory list comprises features for the original components of the computer, original checksums for each original feature value for the features stored in the inventory list and redundancy values that are determined from the entirety of the original feature values,
calculating current checksums from the current feature values;
comparing the current checksums with the original checksums;
if the original checksum and the current checksum are identical, storing the current feature value in a current feature value vector, and if they are not identical creating spaces in the current feature value vector instead of the current feature value;
determining missing feature values in the current feature value vector using redundancy data;
completing the current feature value vector with the determined feature values;
generating the cryptographic key from the feature value vector.

25. The non-transitory computer readable medium according to claim 24, wherein the method further comprises:
generating an inventory list with features for the original components of the computer;
determining original feature values for the features stored in the inventory list;
determining original checksums for each of the original feature values;
determining redundancy values from the entirety of original feature values.

26. The non-transitory computer readable medium of claim 24, wherein the method further comprises:
creating an original inventory list including the features of the computer, the original checksums of the features and the determined redundancy values;

generating the cryptographic key from the entirety of the
original feature values;
transmitting the original inventory list and the generated
key to a server and receiving the data on the server;
deleting the original feature values and the key on the
computer;
generating the computer-specific authorization code for
use of the protected digital data object with the aid of the
received cryptographic key on the server;
transmitting the authorization code encrypted with the
cryptographic key from the server to the computer and
receiving the authorization code on the computer;
and/or by the further steps:
decrypting the encrypted authorization code using the generated cryptographic key on the computer, and
activating the digital data object using the decrypted authorization code.

27. The non-transitory computer readable medium of claim 26, wherein the method further comprises:
transmitting the original inventory list to the server;
deleting the original inventory list including the original checksums on the computer;
signing the original inventory list on the server;
transmitting the signed original inventory list to the computer and receiving the signed original inventory list on the computer.

28. The non-transitory computer readable medium of claim 24, wherein the method further comprises:
transmitting the redundancy values from the computer to the server;
deleting the redundancy values from the computer;
signing the transmitted redundancy values on the server; and
transmitting the signed redundancy values from the server to the computer and receiving the redundancy values on the computer.

29. The non-transitory computer readable medium of claim 24, wherein the digital data object is an application program.

30. The non-transitory computer readable medium of claim 24, wherein the method further comprises:
creating a preset list of features on a server for preparing the inventory list on the computer;
transmitting the preset list of features for the inventory list to the computer;
generating an inventory list with features of the computer according to the preset list received from the server.

31. The non-transitory computer readable medium of claim 24, wherein the inventory list comprises information on the position of the associated feature value for each feature of the computer in the feature value vector and information about the length of the feature value for each feature.

32. The computer readable medium of claim 24, wherein the dataset of the redundancy values is smaller than full dataset of all feature values.

33. The non-transitory computer readable medium of claim 24, wherein the missing feature values in the current feature value vector are determined from the redundancy values using an error correction method.

34. The non-transitory computer readable medium of claim 24, wherein the original inventory list is modified on the server in such manner that an integrity protection of the changed inventory list is guaranteed.

35. The non-transitory computer readable medium of claim 24, wherein the used dataset of redundancy values is increased in accordance with the time that has elapsed since the protected digital data object was used for the first time, wherein the set of redundancy values used increases incrementally over time.

36. The non-transitory computer readable medium of claim 35 wherein, the entirety of generated redundancy values is divided into a plurality of subsets, wherein each subset of the redundancy values is encrypted with a separate cryptographic key and the cryptographic keys are made available to the computer on a time-dependent basis.

37. The non-transitory computer readable medium of claim 35, wherein the method further comprises:
if, during use of the protected data object and the determination of current feature values of the current features of the computer carried out in the context thereof, deviation of current feature values from the original feature values are detected and the missing feature values are capable of being calculated from the existing redundancy values,
updating the redundancy values on the basis of the current feature values,
wherein the redundancy values are either updated by the addition of new redundancy values, or by the generation of a new cryptographic key based on the current feature values, which are determined on the basis of the current features of the computer components, wherein the original cryptographic key and a difference between the new cryptographic key and the original cryptographic key are stored on the computer.

38. The non-transitory computer readable medium of claim 24, wherein the time since the first use of the protected digital data object is counted on the computer and the set of redundancy values used is increased according to the elapsed time, wherein initially only a small fraction of the redundancy values generated is used to determine the missing feature values, and the fraction of used redundancy values increases as time passes.

39. The method of claim 13, wherein the cryptographic function comprises a cryptographic checksum.

40. The non-transitory computer readable medium of claim 28, further comprising:
changing the received redundancy values on the server, preferably reducing the dataset of redundancy values; and
transmitting the changed redundancy values to the computer.

41. The non-transitory computer readable medium of claim 34, wherein the integrity protection is provided by appending a digital signature or a cryptographic key that is considered when evaluating the inventory list on the computer.

42. The non-transitory computer readable medium of claim 35 wherein each subset of the redundancy values is encrypted with a separate cryptographic key and the cryptographic keys are made available to the computer on a time-dependent basis, wherein the providing thereof is assured by the key required for decrypting the encrypted subset of redundancy values being published and downloadable on a separate computer.

* * * * *